Aug. 17, 1965 H. C. BECK 3,201,327

FERMENTATION APPARATUS AND PROCESS

Filed Aug. 21, 1962 3 Sheets-Sheet 1

INVENTOR.
HENRY C. BECK
BY George L. Church
ATTORNEY

INVENTOR.
HENRY C. BECK
BY George L. Church
ATTORNEY

INVENTOR.
HENRY C. BECK
BY George L. Church
ATTORNEY

United States Patent Office 3,201,327
Patented Aug. 17, 1965

3,201,327
FERMENTATION APPARATUS AND PROCESS
Henry C. Beck, Wallingford, Pa., assignor to Sun Oil Company, Philadelphia, Pa., a corporation of New Jersey
Filed Aug. 21, 1962, Ser. No. 218,411
3 Claims. (Cl. 195—109)

This invention relates to a novel means and process for the continuous or batchwise fermentation of liquid or gaseous substrates by means of microorganisms.

More particularly this invention concerns a novel means and process of aerating and dispersing fermentation broth during fermentation so as to accelerate the propagation of the microorganisms feeding upon the substrates.

The novel process and apparatus of this invention provide for the continuous circulation of fermentation broth through a nozzle upwardly against a perforated baffle surface through which a stream of aerating gas containing oxygen is continuously passing. The countercurrent contact of the broth and aerating gas stream coupled with the almost simultaneous deflection of the broth from the baffle surface to the fermentor walls causes the broth to flow down the fermentor walls as an emulsion-like dispersion in substantially sheet or film flow.

The terms "fermentation broth" or "broth" as used throughout this disclosure refer to the mixture of various components of fermentations including substrates, microorganisms, nutrients, trace metals, solvents, diluents, growth factors, and adjuvants such as conditioning agents, surface active agents, foam reducing agents, and the like.

Figure 1:
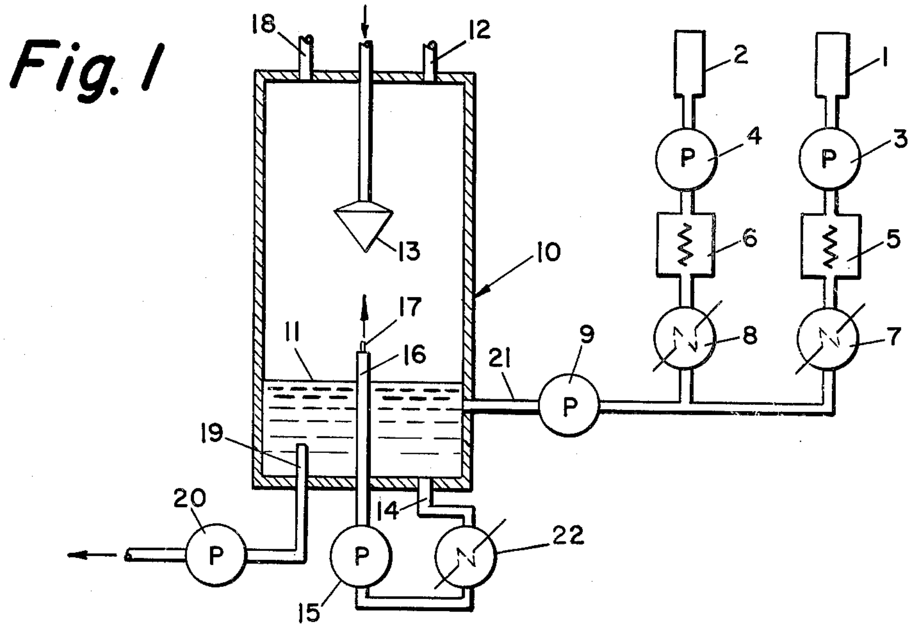

The novelty of the present invention can be more clearly seen by reference to the accompanying drawings:

FIGURE 1 is a partly diagrammatic illustration of the fermentation system and includes an elevational view partly in section of the novel fermentor for use in either a batch or continuous fermentation process.

Figure 2A:
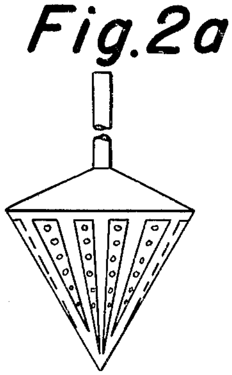
Figure 2B:
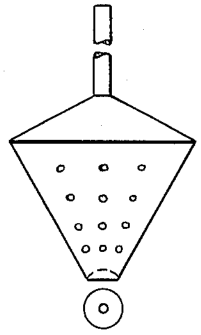
Figure 2C:
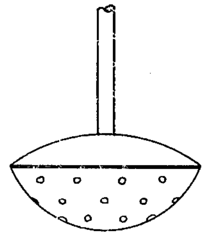
Figure 2D:
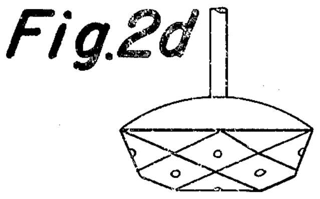
Figure 2E:
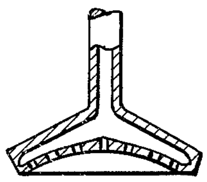

FIGURES 2*a*, 2*b*, 2*c*, 2*d* and 2*e* illustrate various modifications of the baffle against which the broth is deflected so as to obtain maximum dispersion. FIGURES 2*a*, 2*b*, 2*c*, and 2*d* are elevational views of various modifications which have perforated bottom faces that are convex while FIGURE 2*e* is an elevational view in section showing a baffle having a perforated concave lower surface.

Figure 3:
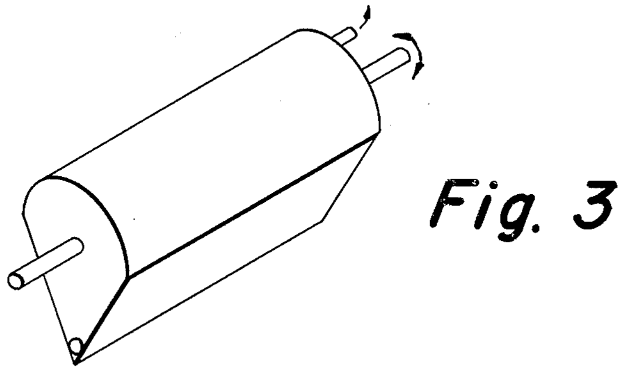
Figure 4A:
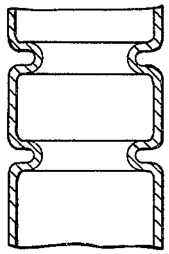
Figure 4B:
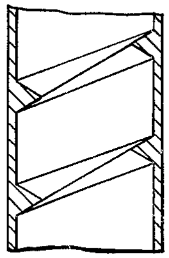
Figure 4C:
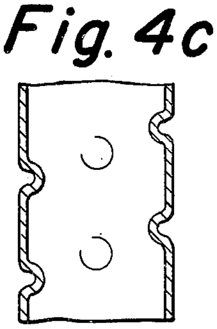
Figure 4D:
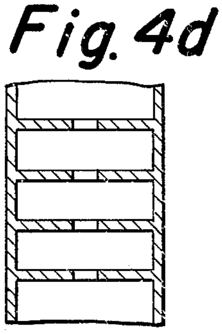

FIGURE 3 shows a cradle shaped fermentor resting on movable rocker supports.

FIGURES 4*a*, 4*b*, 4*c* and 4*d* show several variations of fermentor wall design that are advantageous. All of these fermentor walls have substantially greater surface area than the corresponding walls of smooth design.

FIGURES 5*a*, 5*b*, 5*c*, 5*d*, 5*e*, 5*f*, 5*g*, 5*h*, 5*i* and 5*j* show several nozzle heads of different design. These nozzle heads are used to eject different patterns of broth against one or more deflecting baffles.

Continuous and batchwise fermentation processes are well known to the art. Similarly there is no dearth of aeration, agitation, and dispersion techniques and apparatus. However, almost all of the published literature deals with or is intended to cover the fermentation of carbohydrate substrates. Even more narrowly, most of the art deals wth the fermentation of malt, grain, and sewage. Since carbohydrate substrates are readily attacked by microorganisms under aerobic conditions, the prior art methods are satisfactory for this type of fermentation. However, these prior art processes, techniques, and apparatus are less than satisfactory where substrates less susceptible to attack by microorganisms are used. Among these more difficultly utilized substrates are steroids, sterols, hydrocarbons, and hydrocarbon derivatives. The latter two substrates particularly are recalcitrant to the attack of most microorganisms and even the relatively few microorganisms which are able to metabolize these substrates do so at an exceedindly slow rate. Thus far, modifications of the prior art methods have not appreciably increased the rate of growth of microorganisms on the hydrocarbon and hydrocarbon derivative substrates.

At this time insufficient work has been done on hydrocarbon substrate transformations to explain the difficulty generally experienced by most investigators in obtaining good yields and rapid microorganism growth. However, in many instances, an especially important requirement is that copious quantities of oxygen be made available to the microorganism during its growth period.

In conventional fermentations oxygen is supplied to the microorganisms by various aeration techniques or devices generally separate or incidental to the agitation method used. For example, aeration is generally accomplished by bubbling oxygen or air through the broth under moderate to high pressure. In sewage decomposition and treatment processes, an aeration method frequently used is to allow the sewage broth to flow over surfaces from the top to the bottom of the fermentor vessel or from one vessel to another. In these sewage processes the broth in flow is exposed to the oxygen in the air while its surface area is greatly increased. Agitation on the other hand almost always is supplied by rapidly churning the broth about using power driven impeller or propeller type stirrers. Because of the ease with which the prior art fermentations took place, very little development work has been undertaken to improve the aeration and agitation techniques in spite of some obvious shortcomings. For example, aeration by bubbling air or oxygen through the broth is an inefficient means of supplying oxygen to the microorganism. Even when coupled with agitation with a high speed stirrer, little contact between the oxygen and microorganism takes place. Furhermore, whatever contact does take place is transient and of short duration. Similarly, in methods depending solely on gravity flow for aeration, there is little opportunity for an intimate mixing of an excess of oxygen and broth. The exposure to oxygen that does take place occurs once during the gravity flow of the sewage broth from one vessel to another. No provision is made to continually repeat the contact of the broth with the air at frequent intervals.

Another disadvantage of these conventional processes is the inadequacy of the agitation devices, particularly where the broth contains physically incompatible substances. For example, in a typical hydrocarbon transformation the broth contains a substantial quantity of a water-immiscible hydrocarbon substrate and a large quantity of water along with various inorganic and organic nutrients. Ordinary impellers or propellers are inefficient for stirring large quantities of broth sufficiently rapid to effect any long lasting dispersion of these normally immiscible broth components. Even if it were possible to stir the broth sufficiently to bring about a thorough dispersion, the power costs would be prohibitively high. Yet an intimate mixing or dispersion of the broth with sufficient oxygen is important for accelerating transformation in hydrocarbon fermentations. For these reasons the prior art aeration and agitation devices are generally inadequate for non-carbohydrate fermentations.

The applicant has developed a combination aeration and dispersion process which promotes the rapid propagation of microorganisms growing upon a hydrocarbon substrate to an extent previously unobtainable in the prior art. While the applicant's process and device is primarily directed toward non-carbohydrate fermentations, it performs most satisfactorily in these more conventional types of fermentations.

In the applicant's process the fermentation broth is continuously circulated and ejected at high velocity through a nozzle head, hereinafter described, against a perforated dispersing or deflecting baffle through which an aerating gas containing oxygen is flowing. Any means for circulating the broth to and ejecting it through the nozzle head is satisfactory. For example, a high capacity centrifugal pump can be successfully used. The nozzle head upwardly directed is positioned above the broth surface, generally 1–23 inches above the surface, although the shape and height of the fermentor can make it advantageous to extend the nozzle head even higher above the broth. The nozzle head is aligned toward the dispersing baffle which is positioned above it in the upper portion of the fermentor. The position of the upwardly oriented nozzle head relative to the downwardly oriented dispersing baffle is such that a fountain-like ejection of broth circulating through the nozzle head contacts the dispersing baffle and is deflected outwardly. At the same time aerating gas containing oxygen is passed downwardly through the baffle. Two effects are observed. First the aerating gas countercurrently contacts the broth at the baffle surface, and the aerated broth more or less simultaneously strikes the baffle surface at high speed causing the broth to be deflected outwardly and against the fermentor walls. The deflected fermentation broth passes as a conical spray to the walls of the fermentor and flows downwardly on the walls in substantially thin sheets, thus further potentiating the aeration of the broth.

The aeration and agitation process and device are advantageous in several respects. For example, a more intimate contact between the fermentation broth components and oxygen is achieved. This contact of the broth with oxygen is effected continuously at three different stages of the process; first, where the broth is ejected at high velocity through the nozzle head; second, when the partially aerated fermentation broth stream comes into contact with the aerating gas at the baffle surface; and finally, as the deflected broth passes from the baffle to the walls flowing downwardly thereon in the form of thin emulsion-like sheets. This continual and intimate contact of the broth with oxygen makes practical a more rapid and complete fermentation of substrates by microorganisms requiring large quantities of oxygen including many hydrocarbon substrates.

Another advantage of applicant's device and process is the reduction in power requirements needed to agitate and disperse the broth during fermentation. This is particularly true, as in most hydrocarbon fermentations, the broth contains non-miscible constituents. An example of this is where a hydrocarbon substrate such as hexane or hexadecane is employed in a predominantly aqueous medium. The hexane and water, which normally tend to separate as distinct layers even after vigorous agitation by conventional means, rapidly become homogenized in the apparatus and the pool of broth at the bottom of the fermentator is present in the form of an emulsion. The emulsified broth remains relatively stable even without immediate further treatment. The power required to agitate an immiscible broth system is substantially higher than that required to agitate the same broth mixture when emulsified. Not only is this savings in power reflected in the cost of running the fermentation, but the emulsified broth is more readily and quickly converted to the desired product.

The operation of the device shown in FIGURE 1 is as follows:

Unsterilized nutrient medium and gaseous or liquid hydrocarbon are stored in separate storage vessels or reservoirs designated 1 and 2 respectively. The solutions are separately introduced into the system by metering pumps 3 and 4. They pass through separate thermostatically controlled heating coils 5 and 6 where sterilization takes place. From the heating coils the separate hot and sterilized streams of medium and substrate are passed into separate heat exchangers 7 and 8 whose purpose is to cool the medium and substrate to the desired fermentation temperature.

The temperature of the fermentations will vary according to the microorganism used and the substrate, among other things. The fermentations contemplated will be encompassed within the temperature range of 5–80° C. with the more usual temperature range being 20–50° C. Thermocouples, heat transfer liquids, temperature, and pressure regulating devices, metering pumps, and the like which are used to keep the temperature and pressure within the desired limits are not shown in the flow diagram of FIGURE 1 since they are well known to those skilled in the art and are not critical to the invention. The separate sterilized and cooled streams of medium and substrate are combined in a thermostatically controlled common line and pumped into the fermentor 10 by a pump 9. The pump 9 can be a measuring device such as a metering pump with means for pumping a predetermined volume.

At this time a metered source of oxygen such as air (free from microorganisms) is fed through the perforated openings in the baffle 13 so that the fermentation can have sufficient oxygen available for the propagation of microorganisms. If desired, an additional source of oxygen can be fed into the fermentor below the level of the broth through an air line not shown. The tap 14 on the fermentor bottom is opened and the broth is drawn from the fermentor through a thermostatically controlled cooler 22 by way of a high capacity pump 15 such as a centrifugal pump or its equivalent. The pump is started up and the broth is circulated from the fermentor bottom and pumped under high positive pressure through a tube 16 and to a nozzle head 17 having one or more small diameter orifices through which it is ejected upwardly. The tube 16 is adjustable in height and ordinarily is so positioned that the nozzle head 17 is spaced between 2 and 24 inches above the upper surface of the broth. Preferably the nozzle extends 2–6 inches above the level of the fermentation broth.

The pumped fermentation broth under high positive pressure is ejected from the nozzle head as a high velocity spray which strikes the surface of a perforated baffle 13, and the aerating gas flowing therethrough. The purpose of the dispersing baffle 13 is two-fold. One is to allow the continuous passage of an aeration gas including oxygen under high positive pressure through the perforations on the baffle surface toward the fermentor bottom. This aeration gas continuously contacts the upwardly ejected fermentation broth spray in countercurrent fashion facilitating the aeration and agitation of the fermentation broth. The second purpose of the dispersing baffle is to deflect the ejected fermentation broth against the fermentor walls where it rapidly flows down as an emulsion in substantially sheet flow. The effect of these contacts is to optimize the aeration and agitation of the fermentation broth which accelerates the growth of the microorganisms present and speeds up the rate of substrate transformation. As indicated earlier, optimum aeration is an important factor in a great many aerobic fermentations, particularly in transformations of refractory substrates such as hydrocarbons. Where anaerobic fermentations are contemplated or in the relatively few instances where an excess of oxygen is undesirable, the dispersing baffle can be used to pass an inert gas such as nitrogen or helium to the fermentation system. This flow of inert gas thereby is used as a means of achieving maximum agitation. After the system has been stabilized, a viable culture of the microorganism is added to the broth at the opening 12 to initiate the fermentation.

As the fermentation proceeds the ejection, countercurrent aeration contact and dispersion cycle is continuously repeated giving maximum agitation and aeration to the growing microorganism and emulsifying the medium, substrate, and microorganism. The emulsification of the broth brings about more intimate contact between the microorganism and substrate than can ordinarily be obtained in conventional fermentations where agitation is brought about by impeller or propeller means.

The excess gases or waste gases of the fermentation can be vented off at 18. Where the substrate is gaseous, the vented unconverted substrate can be recycled back to the fermentor or discarded. After the fermentation time for optimal yields has been established, the process may be halted at the optimum time and the products removed at 19 using the pump 20.

The above-described fermentation is in effect a batchwise operation. After the fermentation is completed, the broth is removed and replaced with fresh solution as described supra. However, if it is desired, the fermentation process can be run semi-continuously. This can be accomplished as follows: after the fermentation has reached its optimum peak, increments of product are withdrawn at 19 by the metering pump 20 at regular time intervals. At the same time intervals, comparable increments of broth components are added using metering pump 9 through inlet 21. This system enables the fermentation to be run semi-continuously without the need for frequent shutdowns to remove the broth and replace fermented substrate. The fermentation process can also be operated continuously by the continuous addition of broth components through line 21 and continuous removal of broth product through line 19.

Since the dispersing baffle 13 and nozzle head 17 are important features of applicant's apparatus and fermentation process, more detailed discussion of modifications and variations of these devices follow.

The dispersing baffle 13 can be fabricated from a variety of materials having the required structural strength, thermal stability and resistance to the corrosive effects of the components of the broth. A further requirement is that the baffle should be non-toxic to the broth components. Suitable construction materials include among others, ceramics, plastics, and corrosion resistant metals or alloys.

The shape and design of the baffle can be varied to achieve the desired effects of aeration, agitation, and deflection. FIGURE 1 for example shows the baffle as a smooth surfaced cone whose apex is centered to deflect the impinging stream of ejected broth evenly in all lateral directions. Alternatively, the baffle surface can be polygonal in shape, multifaced like an octahedron, or smooth surfaced like a hemisphere. Any of these baffles can be stationary within the fermentor or can be rotated on their axes during operation of the process.

FIGURE 2 shows additional modifications possible in the baffle. For example, FIGURE 2*a* shows a baffle having slots or notches cut into the surface with the perforations for admitting aeration gas at the base of the slots. FIGURE 2*b* shows a cone-shaped baffle whose apex has been removed and replaced with a concave surface. FIGURE 2*c* shows a baffle having a paraboloid lower surface while FIGURE 2*d* illustrates one with a polygonal surface. While all of the foregoing modifications of the baffle are arranged to present mainly a convex surface facing the nozzle head, the invention can also be practiced with a baffle that presents a concave lower surface such as the baffle illustrated in FIGURE 2*c*. In all of the baffles contemplated the baffle surface will permit passage of aeration gas therethrough and preferably contains a plurality of perforations or orifices of small diameter. Means are provided for supplying a continuous stream of aerating gas containing oxygen to the baffle for passage through the orifices. The aerating gas emerges through the orifices at relatively high positive pressure and makes constant countercurrent contact with the upwardly ejected spray of broth from the nozzle head 17 positioned directly below the baffle. In large fermentors where large volumes of broth are to be accommodated, one or more perforated baffles can be used with one or more nozzle heads instead of a single baffle and nozzle head.

Figure 5A:
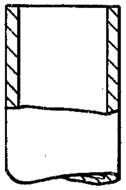
Figure 5B:
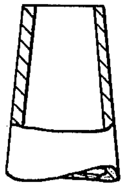
Figure 5C:
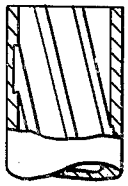
Figure 5D:
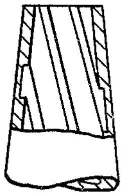
Figure 5E:
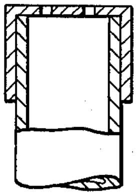
Figure 5F:
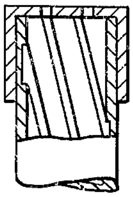
Figure 5G:
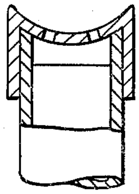
Figure 5H:
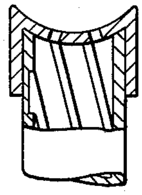
Figure 5I:
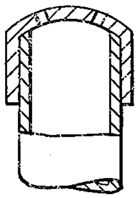
Figure 5J:
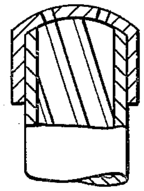

The nozzle head 17 which is used to direct the ejected stream of fermentation broth up and against the dispersing baffle 13 can be made in any one or many different convenient shapes and forms. For example, the nozzle head can be a narrow smooth bore tube as shown in FIGURE 5*a*. The nozzle head in all cases is smaller in diameter than the attached tube through which the pumped fermentation broth is fed to the nozzle head. The main advantage of the smooth bore nozzle of 5*a* is its low cost and the simplicity of design. A more effecnozzle head are shown in FIGURES 5*c* and 5*d*. These head is a tapered version of 5*a*. The tapering of the nozzle head increases the velocity of the ejected fermentation broth stream. Other effective modifications of the nozzle head are shown in FIGURES 5*c* and 5*d*. These nozzle heads are rifled and eject the fermentation broth with a swirling motion causing increased agitation. Further modifications of the basic design of 5*a* are especially useful where the mycelia are comparatively thin or where there is a provision for macerating the solids in the broth at regular intervals during fermentation. These nozzle heads are designated 5*e*, 5*f*, 5*g*, 5*h*, 5*j*, and 5*i*. All have a closed perforated top containing one or more of a plurality of orifices. These nozzles can be tapered or untapered, rifled or smooth bored. For example, 5*e* and 5*f* represent perforated closed nozzle heads respectively without and with rifled bore. The effect of the perforations is to increase the velocity of the ejected stream and to entrap significant quantities of air in the system. FIGURE 5*g* represents a nozzle head having smooth bore but with a concave top. The concave top tends to minimize the tendency of the nozzle head in 5*e* to spray a substantial portion of the broth away from the dispersing baffle surface. The nozzle head illustrated in 5*i* has a smooth bore with a perforated nozzle head having a convex top, while the one shown in 5*j* is the same except that its bore is rifled. This type of nozzle head is primarily designed to be used with a plurality of dispersing baffles, one or more baffles to receive the ejected stream from one or more of the orifices. In each case, a tapered nozzle may be substituted for an untapered one and a rifled bore for a smooth bore.

While all of the above described nozzle heads are satisfactory for ejecting a stream of broth at high velocity against a deflecting baffle surface, some designs of nozzles are preferred for reasons of economy, ease of manufacturing, and ease of cleaning. For example, the nozzle head shown in FIGURE 5*d* is preferred for general use in fermentations where the microorganisms are filamentous or the broth is viscous. However, in fermentations where the broth is not viscous or where velocity or clogging can be minimized, the nozzle head designated 5*f* is preferred.

The design of the fermentor is variable and can be modified according to the type of operation that is intended. For example, the fermentor can be placed to operate in any convenient position vertically, horizontally, or angularly. Similarly, it can be made cradle shaped, cylindrically shaped, rectangularly shaped, triangularly shaped, or any other geometric shape; the main limitation being the cost of custom fabrication. The fermentor shown in FIGURE 1 is the more conventional cylindrical fermentor with smooth walls positioned vertically. FIGURE 3 shows an angularly positioned fermentor, cradle shaped in part, with means for rocking or shaking during fermentation. This type of design allows supplemental agitation and aeration to the fermentor during fermentation.

An important factor in the design of the fermentor is the ratio of fermentor height to fermentor diameter. It has been found that for optimum operation, the fermentor height should greatly exceed its diameter. A height to diameter ratio of 2:1 to 50:1 affords satisfactory operation with 10:1 to 25:1 being the preferred ratio.

An ancillary factory of some importance for optimum fermentor operation is the surface area of the fermentor walls. Increasing the surface area of the fermentor walls while maintaining a constant volume of broth will generally facilitate aeration and dispersion of the broth and up to a point hasten the extent of transformation. The surface area of the fermentor walls can be increased by increasing the volume of the fermentor or by making indentations, ridges, pores, or the like in the walls. FIGURES 4*a*, 4*b*, 4*c*, and 4*d* show some of the many possible modifications of the vertical and smooth walled fermentors. These modifications are advantageous because they increase the degree of contact between the downflowing broth and the oxygen-containing atmosphere adjacent thereto. However, the high cost of fabricating large size fermentors make these designs unattractive for large scale fermentations. For this reason the cylindrically shaped smooth walls, vertically positioned fermentors are generally preferred.

*Example I.—Fermentation of a hydrocarbon substrate*

The apparatus used is a cylindrical fermentor 60" high having a 4" inside diameter such as is shown in FIGURE 1. The distance between the perforated connical deflecting baffle and the tapered nozzle head is 30". The nozzle head is 2" above the body of the broth. The broth is ejected at a pressure of 35–40 p.s.i.g. measured just inside the nozzle. Air is fed through the perforated baffle surface at approximately 10 p.s.i.g. An unidentified microorganism isolated from soil taken from beneath a toluene storage tank is used to oxidize toluene to benzoic acid.

*Experimental*

Washings of the microorganism on a 1–5% agar support are shaken in a 25 ml. flask with a growth medium of ammonium sulfate (0.1%), trace elements, phospate, and magnesium ions, and toluene (0.5%). The flask is shaken at 240 r.p.m. and air is supplied continuously. After 96 hours the growth of the microorganism is pronounced. This growth of cells is used as inoculum the broth which contains the following proportions of components, the remainder being sterile distilled water:

| | Percent by weight |
|---|---|
| Toluene | 0.1 |
| Urea | 0.2 |
| $MgSO_4$ | 0.08 |
| Phosphate buffer | 1.0 |

2000 ml. of the inoculated broth is added to the apparatus which is operated under the conditions described above. During the course of fermentation 2 g. aliquots of toluene are added at 2-hour intervals. The fermentation reaches a peak activity in 25 hours at which the concentration of benzoic acid in the broth reaches 25 g./liter. If batch operation is intended the fermentation now complete is stopped and the broth is withdrawn for processing and isolation of the product, However, here the fermentation is most advantageously operated in a continuous fashion and the following procedure is used.

using the tap 19 of the apparatus of FIGURE 1, 80 ml./hour of broth are continuously withdrawn from the fermentor, and at the same time 80 ml. of sterile broth are continuously added to the fermentor through inlet 21. This maintains the conversion of toluene to benzoic acid at approximately the peak activity. The fermentation is run continuously in this fashion for 71 hours. The total product withdrawn amounted to 5680 ml. and analysis showed that it contained about 23 g. of benzoic acid per liter. The above results indicate the feasiblity of continuous and batchwise operation of applicant's process and apparatus.

I claim:

1. In an apparatus for continuously aerating and intimately admixing a two-phase broth having an aqueous phase and a water-immiscible liquid phase in a fermentor, the improvement comprising a deflecting baffle downwardly oriented and adapted for continuously passing aerating gas through the baffle down toward the fermentor bottom, a nozzle head oriented toward the deflection baffle and positioned below it but above the fermentor bottom to provide a zone for the two-phase broth beneath the nozzle head, and means for continuously passing said broth from said zone and ejecting it up through the nozzle head against the deflecting baffle while contacting the aerating gas passing through the deflecting baffle so as to effect the countercurrent contact of the aerating gas with the ejected and intimately dispersed two-phase broth and the deflection of the aerated broth against the sides of the fermentor in substantially sheet flow.

2. A process for the continuous aeration and dispersion of a two-phase fermentation broth having an aqueous phase and a water-immiscible liquid phase in a fermentor comprising continuously ejecting a stream of the broth upwardly against a perforate deflecting baffle, introducing a continuous stream of an aerating gas to said baffle and flowing it downwardly therethrough to contact the stream of broth and effect the fine dispersion of the water-immiscible liquid phase in the aqueous phase in the form of a spray against the sides of the fermentor in substantially sheet flow, and fermenting the resulting aerated broth.

3. The process according to claim 2 wherein the water-immiscible liquid is a hydrocarbon.

References Cited by the Examiner

UNITED STATES PATENTS

| | | | |
|---|---|---|---|
| 1,980,522 | 11/34 | Hawley | 261—117 |
| 3,041,181 | 6/62 | Simonin et al. | 195—142 |

FOREIGN PATENTS

| | | |
|---|---|---|
| 18,280 | 1895 | Great Britain. |

A. LOUIS MONACELL, *Primary Examiner.*

ABRAHAM H. WINKELSTEIN, *Examiner.*